United States Patent
Garin et al.

(10) Patent No.: US 7,839,330 B2
(45) Date of Patent: Nov. 23, 2010

(54) DETERMINING POSITION WITHOUT CURRENT BROADCAST EPHEMERIS

(75) Inventors: Lionel J. Garin, Palo Alto, CA (US); Lars Boeryd, Rancho Santa Margarita, CA (US); Makarand S. Phatak, Sunnyvale, CA (US)

(73) Assignee: SiRF Technology, Inc., San Jose, CA (US)

( * ) Notice: Subject to any disclaimer, the term of this patent is extended or adjusted under 35 U.S.C. 154(b) by 116 days.

(21) Appl. No.: 11/555,074

(22) Filed: Oct. 31, 2006

(65) Prior Publication Data

US 2008/0129593 A1 Jun. 5, 2008

(51) Int. Cl.
*G01S 1/00* (2006.01)
*H04B 7/185* (2006.01)

(52) U.S. Cl. .............................. 342/357.66; 342/357.25
(58) Field of Classification Search ................................. 342/357.01–357.17, 357.25, 357.66
See application file for complete search history.

(56) References Cited

U.S. PATENT DOCUMENTS

| | | | |
|---|---|---|---|
| 5,430,657 A * | 7/1995 | Kyrtsos ...................... 701/226 |
| 5,909,381 A * | 6/1999 | Shome et al. .................. 703/6 |
| 6,138,061 A | 10/2000 | McEnnan |
| 6,295,021 B1 * | 9/2001 | Lichten et al. .............. 342/355 |
| 6,535,815 B2 * | 3/2003 | Bloebaum ................... 701/213 |
| 6,564,064 B1 * | 5/2003 | Ciganer et al. ........... 455/456.1 |
| 2002/0142783 A1 * | 10/2002 | Yoldi et al. ................. 455/456 |
| 2002/0188403 A1 | 12/2002 | LaMance |
| 2006/0055598 A1 | 3/2006 | Garin |
| 2006/0132358 A1 * | 6/2006 | Holderle et al. ........ 342/357.02 |
| 2006/0145917 A1 * | 7/2006 | Miyano et al. ......... 342/357.12 |
| 2007/0152878 A1 * | 7/2007 | Wang et al. ............ 342/357.06 |

FOREIGN PATENT DOCUMENTS

| | | | |
|---|---|---|---|
| JP | 2003021672 A * | 1/2003 |
| WO | WO2004/031800 A1 | 4/2004 |
| WO | PCT/US2007/083207 | 5/2008 |

* cited by examiner

*Primary Examiner*—Thomas H Tarcza
*Assistant Examiner*—Harry Liu
(74) *Attorney, Agent, or Firm*—Haynes & Boone, LLP.

(57) ABSTRACT

Devices and methods are described for determining position information without broadcast ephemeris data for extended time periods. A client device is disclosed that stores satellite states determined from broadcast ephemeris and numerically integrates equations of motion with regard to the stored satellite states to determine current satellites states. The client device uses the current satellite states in conjunction with received satellite signals to determine where the satellite signals were received.

20 Claims, 2 Drawing Sheets

DETERMINING POSITION WITHOUT CURRENT BROADCAST EPHEMERIS

FIELD OF INVENTION

The disclosed embodiments relate to satellite based positioning systems and methods. More particularly, the disclosed embodiments relate to determining position without the use of current ephemeris information in its broadcast form.

BACKGROUND

Satellite-based positioning systems include constellations of earth-orbiting satellites that constantly transmit orbit information and ranging signals to receivers. An example of a satellite-based positioning system is the Global Positioning System (GPS), which includes a constellation of earth-orbiting satellites, also referred to as GPS satellites, satellite vehicles, or space vehicles. The GPS satellites circle the earth twice a day in a very precise orbit and transmit signal information to the earth. The satellite signal information is received by GPS receivers which can be in portable or mobile units, or in fixed positions on base stations and/or servers.

The GPS receiver uses the satellite signal information to calculate the receiver's precise location. Generally the GPS receiver compares the time GPS signals or satellite signals were transmitted by a satellite with the time of receipt of that signal at the receiver. This time difference between satellite signal reception and transmission provides the receiver with information as to the range of the receiver from the transmitting satellite. Using pseudorange measurements (pseudo because the range information is offset by an amount proportional to an offset between the GPS satellite clock and the receiver clock) from a number of additional satellites, the receiver can determine its position. The GPS receiver uses received signals from at least four satellites to calculate three-dimensional position (latitude, longitude, and altitude), or at least three satellites to calculate two-dimensional position (if altitude is known).

The GPS satellite signals travel by line of sight such that the signals will pass through clouds, glass and plastic but will not pass through most solid objects such as buildings and mountains. Generally, then, GPS receivers are usable everywhere except where it is impossible to receive an adequate satellite signal such as inside some buildings, in caves and other subterranean locations, and underwater. A GPS receiver, when determining position information, typically relies on information from the satellite signal, the absence of which makes position determination impossible. This satellite signal information includes a pseudo-random code along with ephemeris and almanac data to the receivers. The pseudorandom code is a code that identifies the satellite that is transmitting the corresponding signal and also helps the receiver to make ranging measurements. The almanac data tells the GPS receiver where each GPS satellite of the constellation should be at any time over a wide time interval that spans a few days or weeks. The ephemeris data does the same thing but much more accurately though over a much shorter time interval of a few hours.

The broadcast ephemeris data, which is continuously transmitted by each satellite, contains important information about the orbit of the satellite, and time of validity of this orbit information. In particular, the broadcast ephemeris data of a GPS satellite predicts the satellite's state over a future interval of approximately four hours. More particularly, the broadcast ephemeris data describe a Keplerian element ellipse with additional corrections that then allow the satellite's position to be calculated in an Earth-centered, Earth-fixed (ECEF) set of rectangular coordinates at any time during the period of validity of the broadcast ephemeris data. Typically, the broadcast ephemeris data in conjunction with pseudo-range measurements is essential for determining a position.

Because the broadcast ephemeris data is only valid for a four hour interval and is essential for position determination, a GPS receiver is required to collect new broadcast ephemeris data at such time as the receiver needs to compute the satellite state when the validity time for the previously-collected broadcast ephemeris data has expired. The new broadcast ephemeris data can be collected either as direct broadcast from a GPS satellite. Alternatively, satellite ephemeris may be received from a server as discussed in U.S. application Ser. No. 10/941,251, now U.S. Pat. No. 7,142,157, the contents of which are incorporated by reference. However, there are situations under which it is not possible to collect new broadcast ephemeris data from GPS satellites or from a server. As an example of situations in which new broadcast ephemeris data cannot be collected, a low signal strength of the satellite signals can prevent decoding/demodulating of the ephemeris data from the received satellite signal, the client can be out of coverage range of the server, and/or the server can be unavailable for a number of reasons, to name a few. When new broadcast ephemeris data is not available, the GPS receiver is typically unable to provide position information.

Furthermore, even when the GPS receiver is in a position from which it can receive the broadcast ephemeris information from a GPS satellite and/or server and properly decode the signal, the process of receiving and decoding adds substantially to the processing time. This additional processing time directly increases the time-to-first-fix (TTFF) while increasing the power usage of the receiver. Both an increase in the TTFF and the power usage can be unacceptable to a user depending on the use being made of the receiver and power capabilities of the receiver (for example, a GPS receiver hosted on a client device like a cellular telephone would have stricter power use constraints). As a result of the increased use of GPS in consumer devices, and the increased reliance on the information provided by such devices, it is desirable to reduce the number of situations in which the GPS receiver cannot provide position information and/or cannot provide position in a time and power efficient manner.

To address the need in the art for GPS receivers operable to determine satellite ephemeris without reception of current broadcast ephemeris, U.S. patent application Ser. No. 10/941, 251 (the '251 application) discloses a server that receives or collects historical state data of satellites for a satellite-based positioning system and numerically integrates the historical state data to provide predictions of satellite trajectories based upon the historical state data. These predicted satellite states may also be denoted as satellite ephemeris.

It will be appreciated by those of ordinary skill in the arts that the term "ephemeris" is then being used in its strict sense. Although it is conventional in the GPS arts to refer to the transmission of Kepler parameters by the GPS satellites as "broadcast ephemeris," Kepler parameters are not "true" satellite ephemeris but instead are parameters derived from satellite ephemeris. Because the reference to the conventional transmission of Kepler parameters from GPS satellites as "broadcast ephemeris" is a firmly-entrenched practice in the GPS arts, the results from a numerical integration of historical state data may be referred to as "predicted satellite states" to avoid confusion with parameters such as Kepler parameters that are merely derived from satellite ephemeris.

Having calculated the predicted satellite states, the server may transmit these states to client GPS-enabled devices. These client devices may then calculate current satellite ephemeris based upon the predicted satellite states. A time period spanned by the predicted satellite states depends upon the desired accuracy. For example, if +/−40 meter accuracy is acceptable, the predicted satellite states may correspond to every 15 minutes over a seven day period for all the satellites in the GPS constellation. To determine satellite states at a current time within this seven day period, the client device need then merely interpolate the relevant predicted satellite states about the current time. In this fashion, the client device needs relatively little processing power to determine current satellite states. However, considerable bandwidth and storage facilities must be dedicated to the transmission and storage of so many predicted satellite states.

Thus, the '251 application discloses alternative embodiments in which the server does not generate predicted satellite states but rather parameters derived from these predicted satellite states such as Kepler parameters. A client device receives the Kepler parameters from the server and may thus predict satellite trajectories using the Kepler parameters. In this fashion, bandwidth demands for the transmission between the server and the client devices are reduced.

Regardless of whether a client device receives predicted satellite states or parameters derived from these states, the client device will still require a server to generate and transmit the states/parameters. Such an infrastructure may be expensive to implement and maintain.

Accordingly, there is a need in the art for improved GPS devices that may determine position without the use of broadcast ephemeris or ephemeris received from other sources.

SUMMARY

In accordance with an aspect of the invention, a device is provided that includes: a satellite state predictor operable to calculate current satellite states using broadcast ephemeris previously received from a plurality of satellites, and a location determination system adapted to use the current satellite states in a determination of a location for the device if current broadcast ephemeris is unavailable.

In accordance with another aspect of the invention, a method is provided that includes: receiving broadcast ephemeris from a plurality of satellites to determine satellite states for the plurality of satellites; storing the satellite states; numerically integrating equations of motions for plurality of satellites using the stored satellite states to determine current satellite states; in a receiver, receiving satellite signals from the plurality of satellites; and calculating a position for the receiver using the received satellite signals and the current satellite states.

BRIEF DESCRIPTION OF THE DRAWINGS

These figures are provided to assist in describing embodiments of the invention, and are not intended to be exclusive or limiting. In the figures, like reference numerals designate like elements.

DETAILED DESCRIPTION

Figure 1:
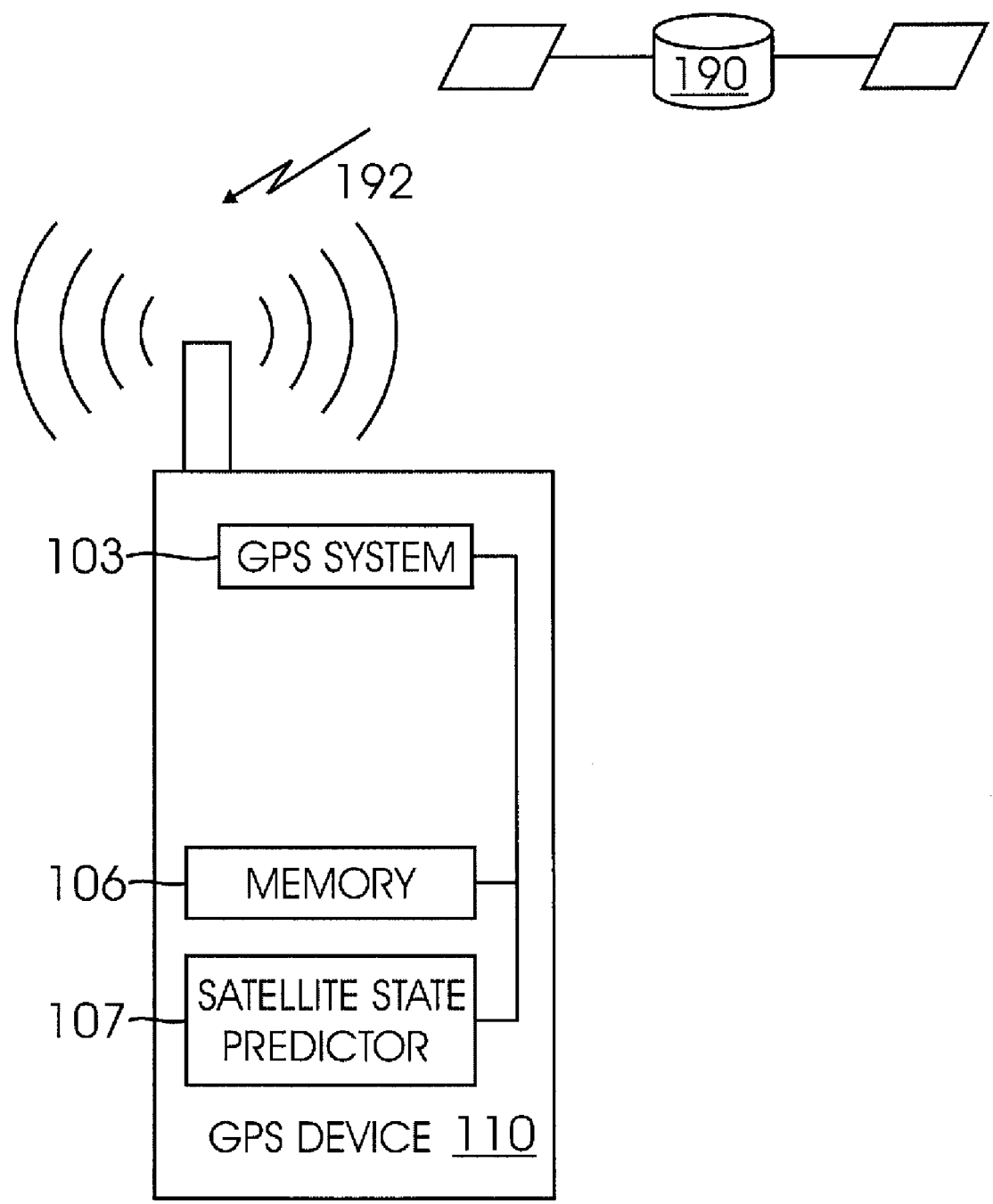
FIG. 1 is a block diagram of a GPS system in accordance with an embodiment of the invention.

Devices and methods are described for determining satellite ephemeris without the use of current broadcast ephemeris data for extended time periods. Turning now to FIG. 1, a GPS-enabled device 110 includes a GPS system 103. GPS system 103 receives GPS-encoded signals 192 from satellites 190 (for illustration clarity, only a single satellite is shown). During conventional operation, the GPS system decodes the GPS-encoded signals from the satellites to retrieve broadcast ephemeris for the satellites. The GPS system then uses this broadcast ephemeris to determine current satellite state information, which is then used in combination with pseudorange data to provide a location for the GPS device.

However, if the GPS system has just been powered up, a certain period of time is required to receive the broadcast ephemeris from the satellites. Moreover, urban environments such as parking garages and tall buildings may make the reception of current broadcast ephemeris problematic. To provide an ability to calculate current satellite state information, the present invention provides a GPS-enabled device that uses previous broadcast ephemeris. For example, suppose GPS-enabled device 100 had been used in a conventional fashion such that the device was determining its position using satellite state information derived from current broadcast ephemeris from the GPS satellites. The GPS system stores the satellite state information (which includes satellite positions and velocities) in a memory 106. Should the GPS system attempt to determine its position subsequently but be unable to acquire an "open sky" reception of current broadcast ephemeris, a satellite state predictor 107 is adapted to determine current satellite states using the previously-stored satellite state information in memory 106.

The satellite state predictor may determine current satellite states through numerical integration of GPS satellite equations of motion using appropriate force models. Apart from Earth gravity, these force models include a model of the gravitational effects of the Moon and the Sun, typically denoted as a luni-solar model. For example, a luni-solar model may include solar values for inclination, distance, node, angle to node, and rate of angle to node. In addition, lunar values for inclination, distance, node, angle to node, and rate of angle to node would also be used in such a luni-solar model. Similarly, Earth orientation may be represented using a pole position x, a pole position y, and a length of day. Furthermore, parameters for solar radiation pressure and yaw-bias (y-bias) are also useful.

A series expression in the form of $A+Bt+Ct^2+D\cos(wt)+E\sin(wt)$, where t represents the current time and A, B, C, D, E, and w are constants, provides a compact and efficient way to determine these parameters. However, it will be appreciated that these parameters may be represented using alternative expressions. Moreover, additional or alternative parameters for the satellite equations of motion may also be determined.

The values of constants A, B, C, D, E, and w for these series expressions may be obtained offline by numerically fitting the series to past data for the Earth orientation, solar radiation pressure, and y-bias parameters. Because the luni-solar parameters do not have the stochastic variation found in the Earth orientation, solar radiation pressure, and y-bias parameters, offline models may be used to accurately predict future values for the luni-solar parameters. Thus, the A, B, C, D, E, and w values for the luni-solar parameters may be obtained through curve fitting to both past and future data. Once obtained, these constants are valid for approximately 6 months for the stochastically-varying parameters. The constants for the luni-solar parameters would be valid for considerably greater periods of time. Having determined the constants, a designer or user may then "burn" them into memory 106. In this fashion, the GPS state predicator may calculate parameters such as Earth orientation, lunar inclination, and solar inclination for any time during the valid period (such as 6 months) for these stored constants by plugging the current value for time t into the series expression discussed above. Having calculated these parameters using the series expressions, the GPS state predictor may then predict current satellite states by numerically integrating GPS satellite equations of motion using the calculated parameters.

After the valid period for the constants has expired, the client device may be coupled to an external source such as the Internet or a wireless connection to receive new values for the constants. Having refreshed the values, the client device may continue to calculate current satellite states by numerically integrating the satellite equations of motion. Numerical integration can be done by any standard numerical integration method such as a Runga-Kutta method or a multi-step-type method.

Figure 2:
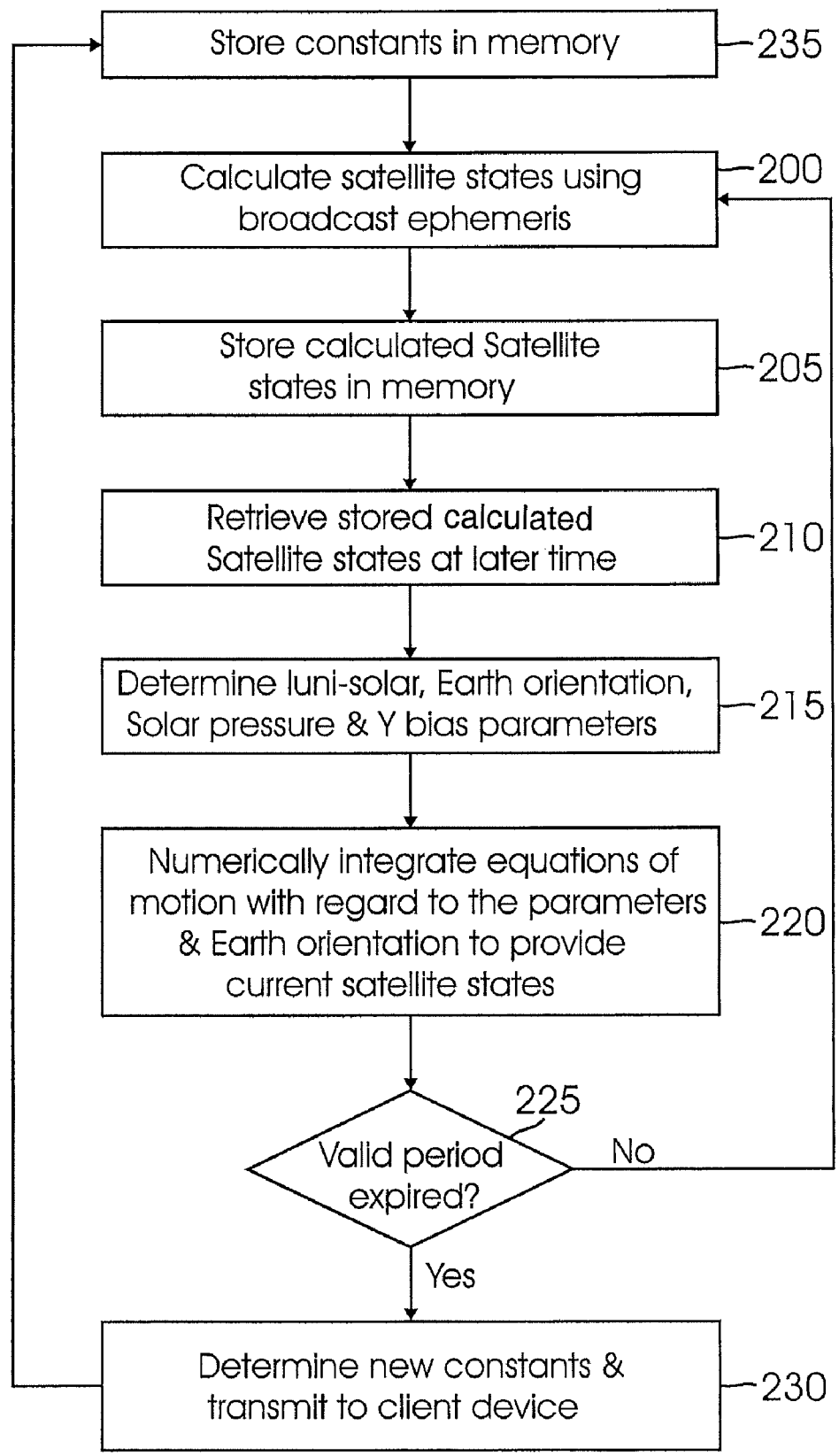
FIG. 2 is a flowchart illustrating a method of calculating current satellite states in accordance with an embodiment of the invention.

The prediction of current satellite states may be better understood with reference to the flowchart of FIG. 2. In step 200, satellite states are calculated using broadcast ephemeris in a conventional fashion. At step 205, the calculated satellite states from broadcast ephemeris are stored in memory. At this point, a GPS-enabled device performing the prediction may be powered down or placed into an inactive mode. At a later time, the GPS-enabled device is powered up or brought into an active mode such that it attempts to re-acquire broadcast ephemeris. However, due to environmental conditions such as being in an urban canyon, parking garage, natural obstructions such as mountains or trees, radio frequency noise, or some other conditions, the GPS-enabled device does not have clear sky reception of broadcast ephemeris. Because there is no current reception of broadcast ephemeris, the GPS-enabled device retrieves the stored satellites states from memory in step 210. In step 215, the GPS-enabled device determines luni-solar values as well as Earth orientation values, solar pressure, and y-bias values using, for example, the compact series expressions described herein. In step 220, the GPS-enabled device numerically integrates satellite equations of motion using the luni-solar, Earth orientation, solar pressure, and y-bias values with regard to the stored satellite states to calculate current satellite states. The numerical integration may provide incorrect results if there has been a change in satellite state due to, for example, satellite maneuver or change or reset of clock subsequent to broadcast ephemeris received in step 200. These changes can be detected in the client device using RAIM (Receiver Autonomous Integrity Monitoring) algorithms to prevent computation of erroneous user position.

Because the parameters are only valid for a period of approximately six months, a test of whether the valid period has expired occurs may occur at step 225. If the valid period has expired, new constants are determined offline and transmitted to the client device at step 230. The received constants may then be loaded into the client device's memory at step 235.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A device, comprising:
    a satellite state predictor operable to calculate current satellite states using broadcast ephemeris previously received from a plurality of satellites, wherein a validity time for the previously-received broadcast ephemeris has expired, and
    a location determination system adapted to use the current satellite states in a determination of a location for the device if current broadcast ephemeris is unavailable.

2. The device of claim 1, wherein the plurality of satellites are GPS satellites and the location determination system is a GPS location determination system.

3. The device of claim 2, wherein the GPS satellite state predictor is adapted to calculate current satellite states by numerically integrating equations of motion for the GPS satellites.

4. The device of claim 3, wherein the GPS satellite state predictor is adapted to calculate at least one parameter selected from the group consisting of a current lunar parameter, a current solar parameter, a current Earth orientation parameter, a solar radiation pressure parameter, and a y-bias parameter, the GPS satellite state predictor being further adapted to adjust the equations of motion according to the at least one parameter before the numerical integrations.

5. The device of claim 4, wherein the GPS satellite state predictor is adapted to calculate the at least one parameter using a series expression.

6. The device of claim 5, wherein the series expression is a series expression of powers and sinuosoids.

7. The device of claim 6, wherein the series expression in the form of $A+Bt+Ct^2+D\cos(wt)+E\sin(wt)$, where A, B, C, D, E, and w are constants and t represents a current time.

8. The device of claim 1, wherein the location determination system is further adapted to use current broadcast ephemeris to determine the current satellite states if the current broadcast ephemeris is available.

9. The device of claim 1, wherein the satellite state predictor comprises a processor.

10. A method, comprising:
    receiving broadcast ephemeris from a plurality of satellites to determine satellite states for the plurality of satellites;
    storing the satellite states;
    after a validity time for the received broadcast ephemeris has expired, numerically integrating equations of motions for plurality of satellites using the stored satellite states to determine current satellite states;
    in a receiver, receiving satellite signals from the plurality of satellites to provide a plurality of pseudo-range measurements; and
    calculating a first position for the receiver using the pseudo-range measurements and the current satellite states.

11. The method of claim 10, further comprising: calculating a second position for the receiver using current broadcast ephemeris and the received satellite signals.

12. The method of claim 10, further comprising:
    calculating at least one parameter selected from the group consisting of a current lunar parameter, a current solar parameter, a current Earth orientation parameter, a solar radiation pressure parameter, and a y-bias parameter; and adjusting the equations of motion according to the at least one parameter before numerically integrating.

13. The method of claim 12, wherein calculating the at least one parameter comprises calculating the current lunar parameter, the current solar parameter, the current Earth orientation parameter, the solar radiation pressure parameter, and the y-bias parameter.

14. The method of claim 13, wherein calculating the current lunar parameter, the current solar parameter, the current Earth orientation parameter, the solar radiation pressure parameter, and the y-bias parameter comprises determining values for a plurality of series expressions.

15. The method of claim 14, wherein each series expression is a series expression of powers and sinusoids.

16. The method of claim 15, wherein each series expression is in the form of $A+Bt+Ct^2+D\cos(wt)+E\sin(wt)$, where A, B, C, D, E and w are constants and t represents a current time.

17. The method of claim 16, further comprising: processing historical satellite states to determine the constants A, B, C, D, E and w.

18. The method of claim 17, further comprising: storing the constants A, B, C, D, E and w in non-volatile memory.

19. The method of claim 17, further comprising: determining whether a valid period for the constants has expired.

20. The method of claim 19, further comprising: if the valid period has expired, re-calculating the constants.

* * * * *